United States Patent [19]
Counts, Jr.

[11] Patent Number: 5,915,132
[45] Date of Patent: *Jun. 22, 1999

[54] MODULAR STILL PHOTOGRAPHY STUDIO

[76] Inventor: Jack Edwin Counts, Jr., 16445 Collins Ave., Unit 2426, Miami Beach, Fla. 33160

[*] Notice: This patent issued on a continued prosecution application filed under 37 CFR 1.53(d), and is subject to the twenty year patent term provisions of 35 U.S.C. 154(a)(2).

[21] Appl. No.: 08/864,198

[22] Filed: May 28, 1997

[51] Int. Cl.$^6$ .................................................. G03B 17/24
[52] U.S. Cl. ...................................... 396/1; 396/4
[58] Field of Search ...................... 396/1, 3, 4, 5

[56] References Cited

U.S. PATENT DOCUMENTS

| | | | |
|---|---|---|---|
| 4,512,117 | 4/1985 | Lange | 52/6 |
| 5,758,196 | 5/1998 | Liang | 396/1 |

OTHER PUBLICATIONS

Copies of pages from a Bogen Pro Studio Rail System brochure, undated but admitted to be prior art.
Article from Apr. 1997 issue of Range Finder entitled "Logan's Super Studio Where Seniors Are Stars For The Day" by Diane Ainsworth.

*Primary Examiner*—David M. Gray
*Attorney, Agent, or Firm*—McAfee & Taft

[57] ABSTRACT

A modular still photography studio comprising a plurality of adjacent photography set frames is provided. The studio is an apparatus which provides for converting any space, such as a room into a multiple set photography studio. The photography set frames each include a pair of vertical legs and a connecting beam extending therebetween. A still photography set which includes various props and devices to create different environments or scenes may be created to correspond with each of the photography set frames so that a plurality of still photography sets may be positioned adjacent one another. A camera means can be positioned within the studio and may be directed a still photography set corresponding to any of the adjacent photography set frames and may thus capture the image of the still photography set corresponding to any photography set frames from within the studio. Remotely movable lights are mounted to the studio to provide lighting to each of the adjacent photography set frames and still photography sets corresponding thereto.

31 Claims, 10 Drawing Sheets

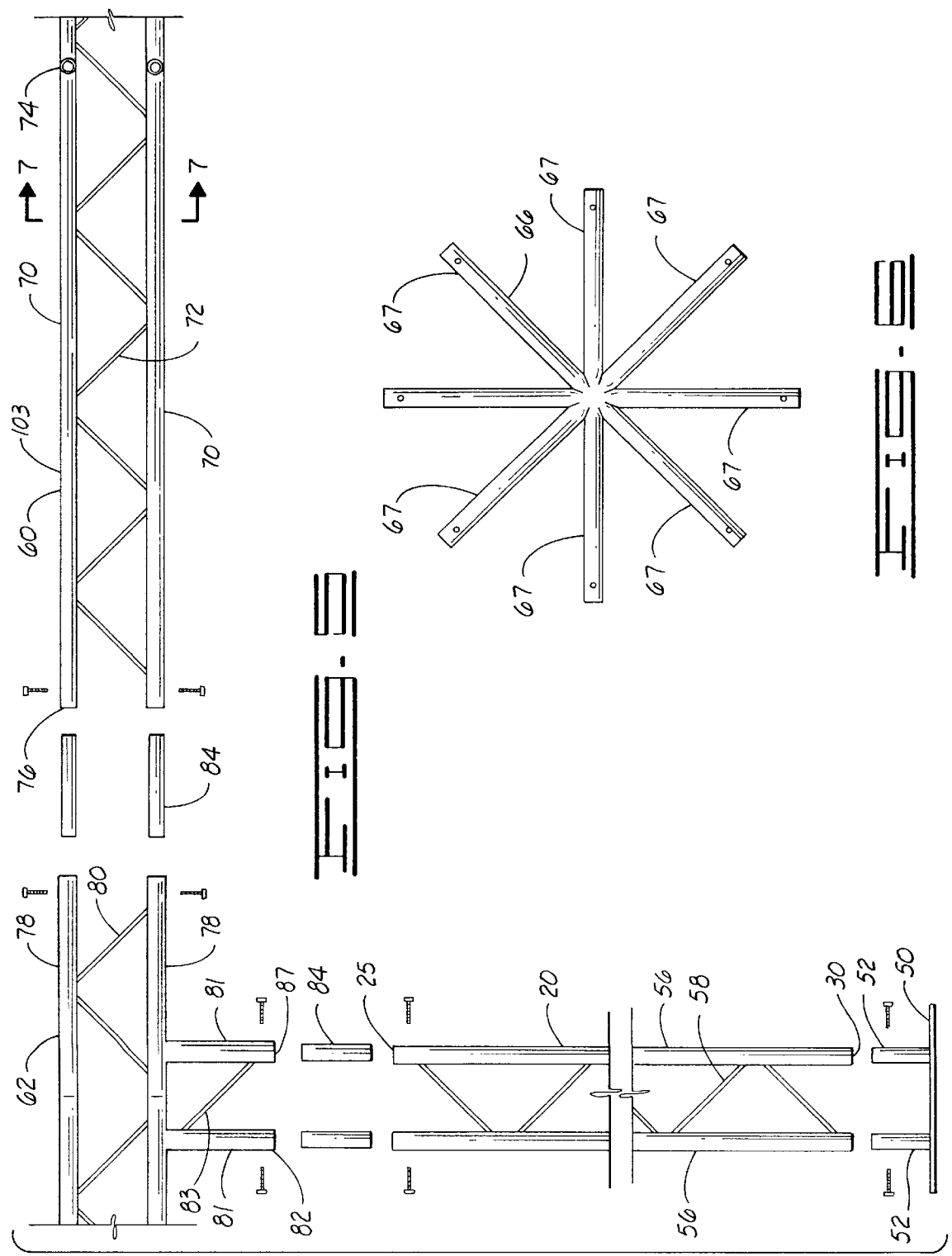

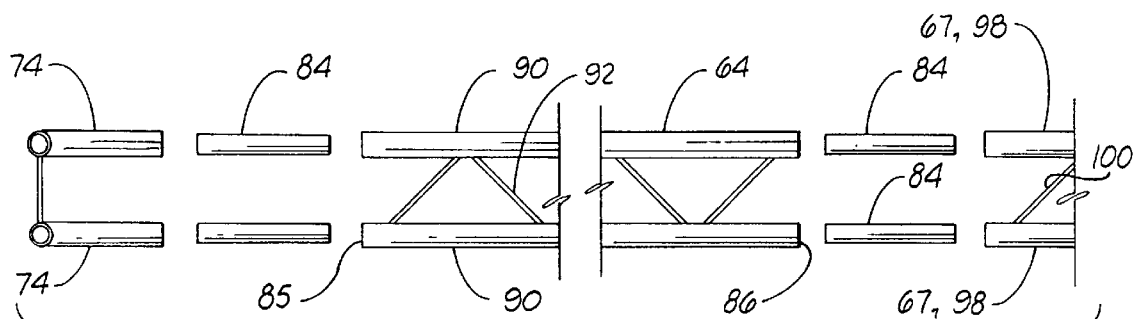
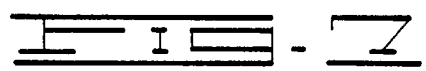
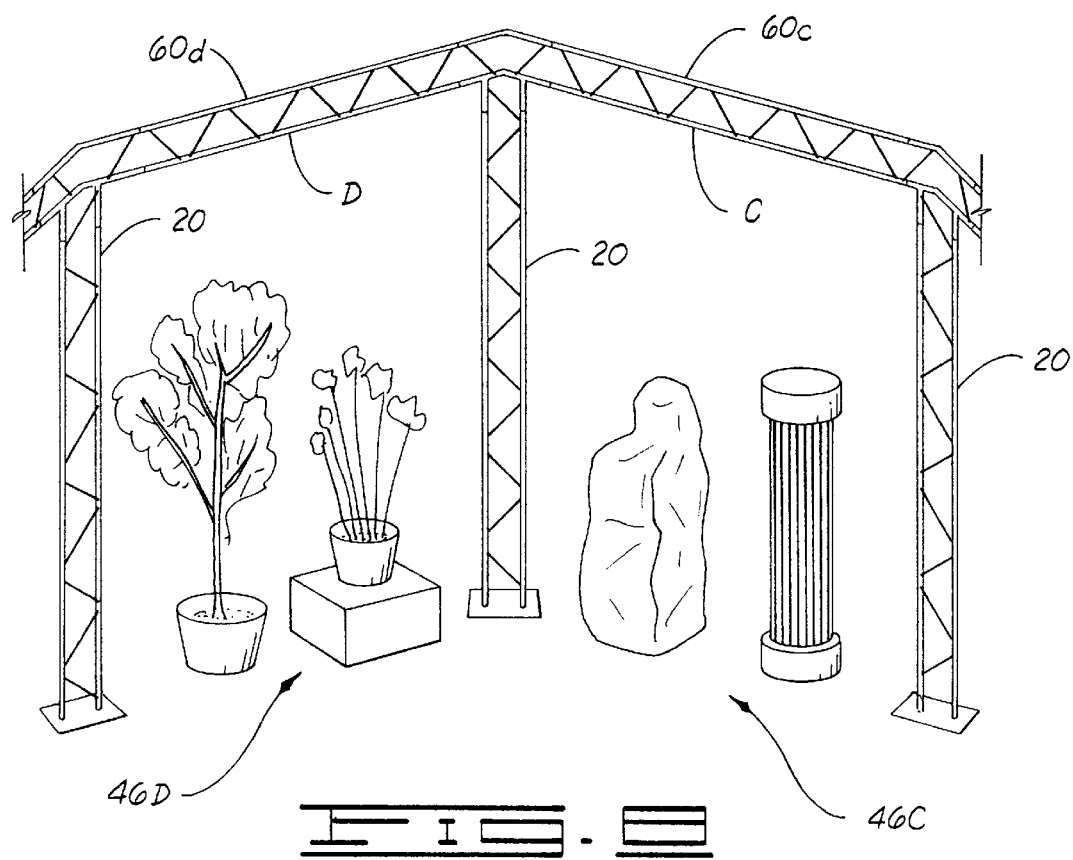

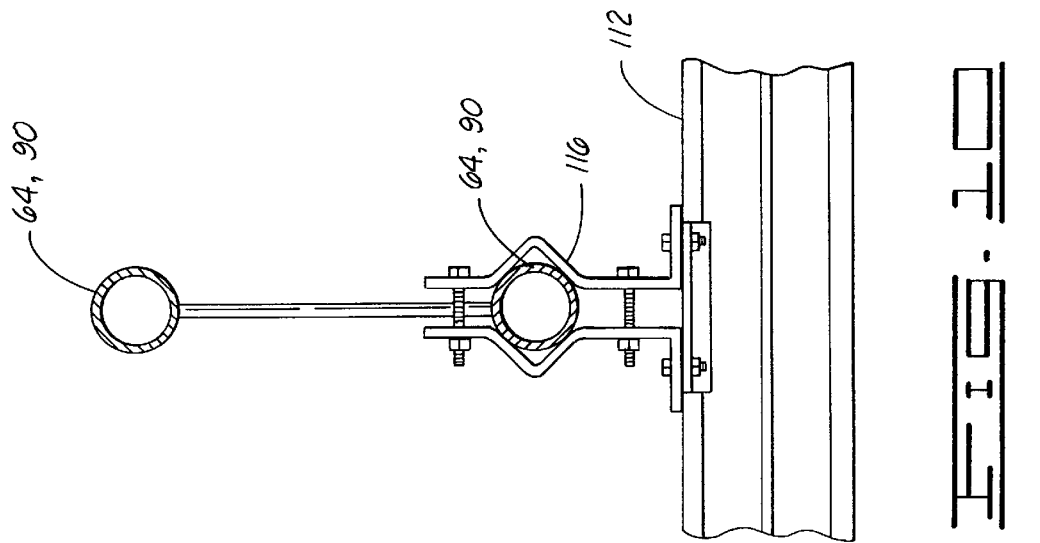
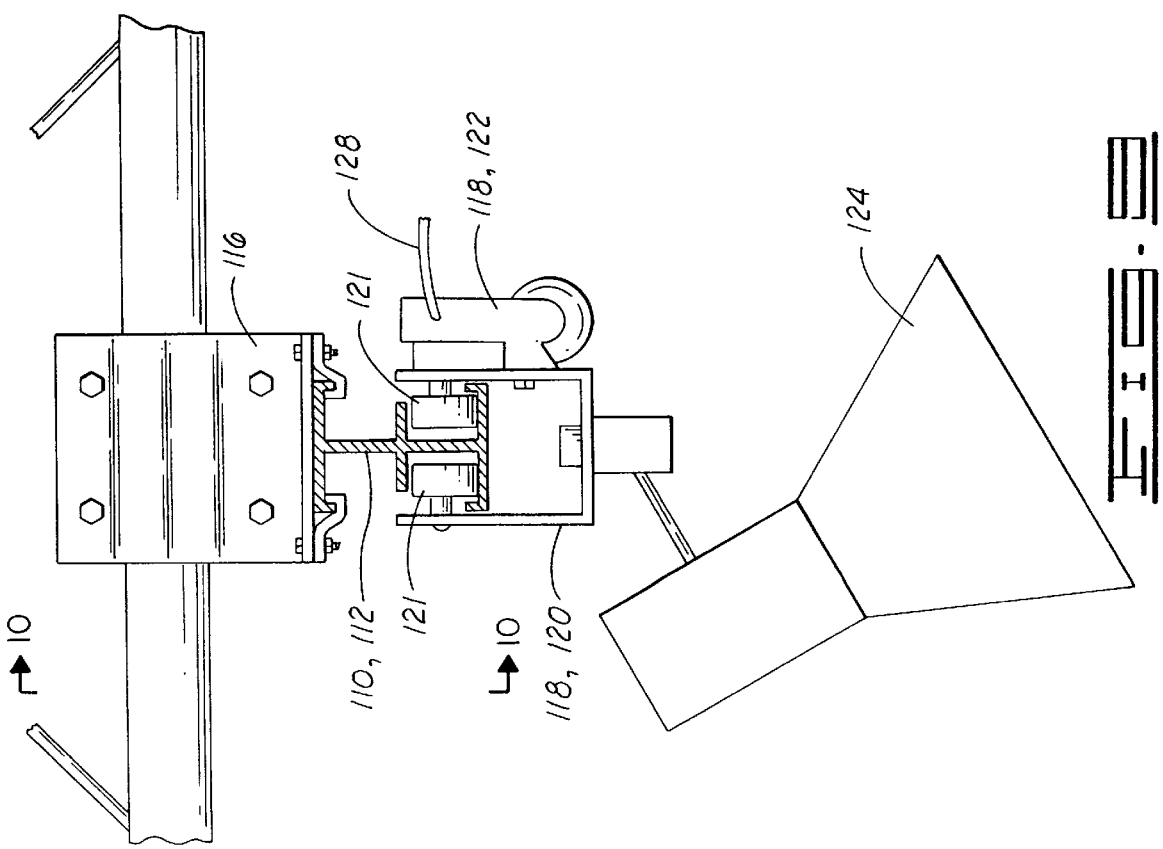

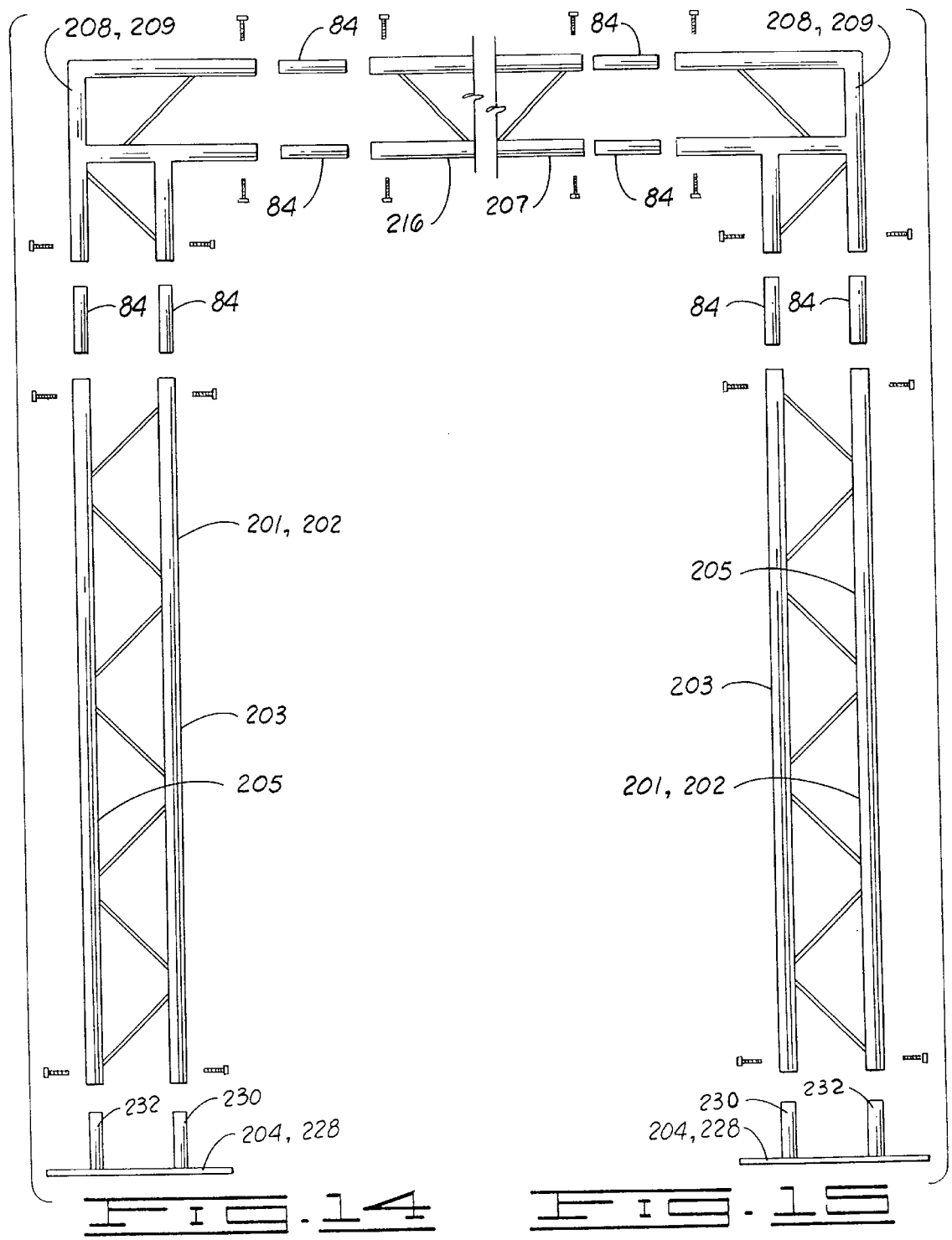

MODULAR STILL PHOTOGRAPHY STUDIO

BACKGROUND OF THE INVENTION

The present invention relates generally to a photography studio and more specifically, to a freestanding modular still photography studio which provides a plurality of modules, or frames in which to create still photography sets.

In the still photography industry, the ability to provide different backgrounds and to create different settings for photographs and photographic portraits has long been a necessity so that the needs and desires of the customer can be sufficiently met. The industry has long used various apparatus to create different environments or sets in which to take photographs or photographic portraits. In a studio setting, different backgrounds, or environments, may be created by changing the backdrops that are used, which are simply flat background scenes, and by changing various props and devices. While the use of different backdrops and props can provide for numerous different photographic settings, there are certain drawbacks inherent in such an arrangement.

First, the consumer, or subject to be photographed is limited in the type of settings that can be selected. For instance, the consumer typically will see only flat backdrops, and a few props, but will not have the opportunity to see several environments, or sets, already created, from which to choose.

Second, it is time consuming and inefficient to continually change backdrops and props to create different sets. Each time a different background is created in that manner, camera and light positions must be adjusted to insure proper placement. Continually changing backdrops, lighting positions and camera positions is time consuming and inefficient.

Finally, while the use of backdrops and props can provide different backgrounds, the flat one-dimensional backdrops used in commercial studios often create a "fake" look that is undesirable for both the photographer and the subject being photographed. Some of the above drawbacks have been addressed by creating numerous fixed "miniature movie sets" in a several thousand square foot facility. Each miniature movie set has its own lighting, cameras, and other equipment. While such a facility does provide the consumer with a selection of sets, it does not address the needs of the typical, much smaller studio which does not have several thousand square feet in which to build several separate movie sets, each with independent lights and camera positions. For example, many photography studios are located in malls, shopping centers, or other facilities where there is simply not enough space to erect separate fixed movie sets, each with its own independent lights and other equipment.

Thus, there is a need for studios to be capable of providing a plurality of sets which create different environments, for example, home or other indoor environments, garden and other outdoor environments, and any other type of environmental setting which can be simultaneously viewed by the consumer and the photographer. There is a need for an apparatus which will, in a time and space efficient manner provide for the placement in a studio of numerous environmental still photography sets which can be photographed from a relatively central location, and in which lighting can be provided to each set with little manipulation required by the photographer.

SUMMARY OF THE INVENTION

The present invention solves the drawbacks addressed herein by providing an apparatus for converting a limited or defined space such as a walled space or room, into a multiple set photography studio. The apparatus may generally be referred to as a freestanding modular still photography studio. The modular studio addresses the drawbacks associated with prior studios by providing a plurality of adjacent photography set modules, or photography set frames, wherein each photography set frame provides a space for locating an environmental still photography set. In a preferred embodiment, the modular studio defines a polyhedron having a polygonal horizontal cross section that is preferably an equilateral polygon. An environmental still photography set can be located in, and/or adjacent selected of the adjacent photography set frames, which may be all of the frames if desired.

The modular studio includes a rotatable main light assembly, which can be placed at a predetermined location and which can be directed at a selected still photography set corresponding to any of the photography set frames simply by rotating the main light assembly. The modular studio also provides for predetermined, accent light locations, such as hair light locations. One or more accent lights are movably connected to a rail that is spaced a predetermined distance from each photography set frame, so that an accent light can be positioned on the rail, and can be moved on the rail to provide lighting to a selected still photography set corresponding to any of the photography set frames. The rail is shaped so that the distance between the accent light and corresponding photography set frame being lighted is the same for all photography set frames. The rail on which the accent lights are carried is preferably circular.

Further, because the studio preferably defines a polyhedron, photographs can be taken from a relatively central location. In other words, photographic images of a selected still photography set corresponding to any photography set module can be taken with a camera means positioned within the polyhedron defined by the studio. In addition, because the position of the lights may be predetermined, the general position of the subject to be photographed can be predetermined. The modular studio of the present invention thus gives the impression of a "studio in the round," with a selectively directable main light assembly, a centralized camera location, and predetermined accent light positions, all located within the studio, which has a plurality of adjacent photography set modules and a plurality of still photography sets corresponding to the photography set modules. The modular studio provides all of the foregoing features, and at the same time can be assembled in a defined space, such as a room having limited space in an existing photography studio.

The freestanding modular still photography studio of the present invention thus comprises a plurality of adjacent photography set frames, wherein the adjacent set frames are defined by a plurality of substantially vertical legs, or upright supports. The modular studio may also include a ceiling section connected to an upper end of the vertical legs. The ceiling section may comprise a plurality of outer, or connecting beams extending between and connected to adjacent ones of the vertical legs. The ceiling section may also include a plurality of center beams connected at one end to the outer beams and connected at a second end to a central hub, or spider. Each photography set frame may thus be comprised of a pair of adjacent vertical legs and a connecting beam extending therebetween. A camera means can be positioned within the polyhedral shape defined by the adjacent photography set frames, and can be directed therefrom at each of the plurality of adjacent photography set frames.

Selected of the photography set frames, which may be all of the frames, may have still photography sets corresponding thereto, or operably associated therewith. A still photography set that is located in a photography set frame, or adjacent the photography set frame in a direction inward, toward the camera means, or outward, away from the camera means corresponds to, or is operably associated with the photography set frame. Likewise a photography set frame corresponds to a still photography set that is located in and/or adjacent the photography set frame. Thus, a photographic image of a selected still photography set may be captured by directing the camera means at the photography set frame corresponding to the selected still photography set from inside the studio, and actuating the camera means. The border, or outer boundary of the photographic image of the selected still photography set captured by the camera means may be within the corresponding photography set frame.

The vertical legs of the modular studio can divide any space, including a walled space such as a room in an existing studio, into a multiple set studio. The legs may define the parameters for creating and locating a still photography set, assuring that a photographic image of the still photography set will be captured when the camera means is directed at the corresponding photography set frame. Additionally, the legs provide a clear separation means between photography set frames, thus aiding the set designer by providing defined parameters for a still photography set, and aiding the consumer by providing a clear separation between still photography sets.

As described above, each photography set frame may have a still photography set corresponding thereto. A still photography set could include a waterfall with running water, foliage and a boulder for posing. Other still photography sets might include Italian architecture with columns, in stucco or marble accents, a home setting with richly colored rugs, wood floors and leather furnishings, an English garden, with lifelike foliage and flowers on a trellis and a tree for posing. The still photography sets can be changed periodically to reflect current events or trends and seasons, occasions or customs such as Christmas settings, beach settings or any desired setting.

Because the studio provides a plurality of adjacent photography set frames, each of which can have a still photography set corresponding thereto, and because of the shape of the studio, the camera means can be positioned within the studio and can be directed at each photography set frame, and thus at the corresponding still photography sets, from within the studio with very little movement required. Essentially, the camera means simply will need to be rotated to be directed at the particular photography set frame being utilized, thus providing for a centralized camera position or location and photographer position.

The rotatable main light assembly, and other lights may be mounted to the ceiling section. The rotatable main light assembly may have a single light or a plurality of lights suspended therefrom. The main light assembly may be connected to the ceiling section at a central location, equidistant from each photography set frame. Thus, a central or main light is provided that can be rotated to direct light at a selected still photography set corresponding to any of the photography set frames as desired. The main light assembly may be remotely rotatable to the desired position as will be described in more detail herein.

A rail system, including a rail and a motorized carriage may also be mounted to the ceiling section. A light which is preferably an accent light, such as a hair light may be attached to the motorized carriage so that the light is movable along the rail. The rail is positioned inwardly, toward the inside of the polyhedral shaped studio a predetermined distance from each photography set frame and is shaped so that the light attached thereto may be moved along the rail to provide lighting to each photography set frame and a corresponding still photography set. The rail may be shaped to provide light positions that are equidistant from each photography set frame. Equidistant lighting provides consistent lighting, and thus consistent, high quality photographs. As may be described further herein, the motorized carriage is remotely movable along the rail so that the light may be remotely moved on the rail to a desired position to provide lighting to any selected still photography set. The terms main light and, accent, or hair light, refer to the position of the lights related to the still photography set to be photographed, and as understood in the art, does not refer to any particular type of light. The main light assembly may thus have one or more lights included therewith or attached thereto, and may include, but is not limited to Paul C. Buff, Ultra 1200 or Ultra 1800, and/or Norman GL 3000 lights. The accent or hair lights may include, but are not limited to Paul C. Buff, Ultra 600, and/or Norman LH 500 lights.

The modular studio described herein is easily assemblable and disassemblable and thus provides an apparatus for converting any space into a multiple set photography studio. The studio may also be of a size that will fit in any desired space, for example, but not limited to a 15×15, 20×20, or 25×25 foot room, to convert the room into a multiple set photography studio.

It is thus an object of the invention to provide a modular still photography studio which is readily assemblable and disassemblable and which will convert a defined space into a multiple set still photography studio. It is another object of the invention to provide a modular studio which provides a plurality of adjacent photography set modules in which to locate a still photography set. It is another object of the invention to provide a space and time efficient studio which has easily manipulable lights and from which different still photography sets can be photographed from a substantially central camera position.

BRIEF DESCRIPTION OF THE DRAWINGS

FIG. 5 is an exploded view showing the assembly of the present invention.

FIG. 6 is a top view of a central hub, or spider of the present invention.

FIG. 7 is a view from line 7—7 of FIG. 5.

FIG. 8 is a schematic of environmental still photography sets arranged in the studio of the present invention.

FIG. 9 is a view from line 9—9 showing a light mounted to the studio of the present invention.

FIG. 10 shows a view from line 10—10 of FIG. 9 without light and carriage.

FIG. 14 is a view from line 14—14 of FIG. 3.

FIG. 15 is a view from line 15—15 of FIG. 3.

DESCRIPTION OF A PREFERRED EMBODIMENT

Figures 1, 1A:
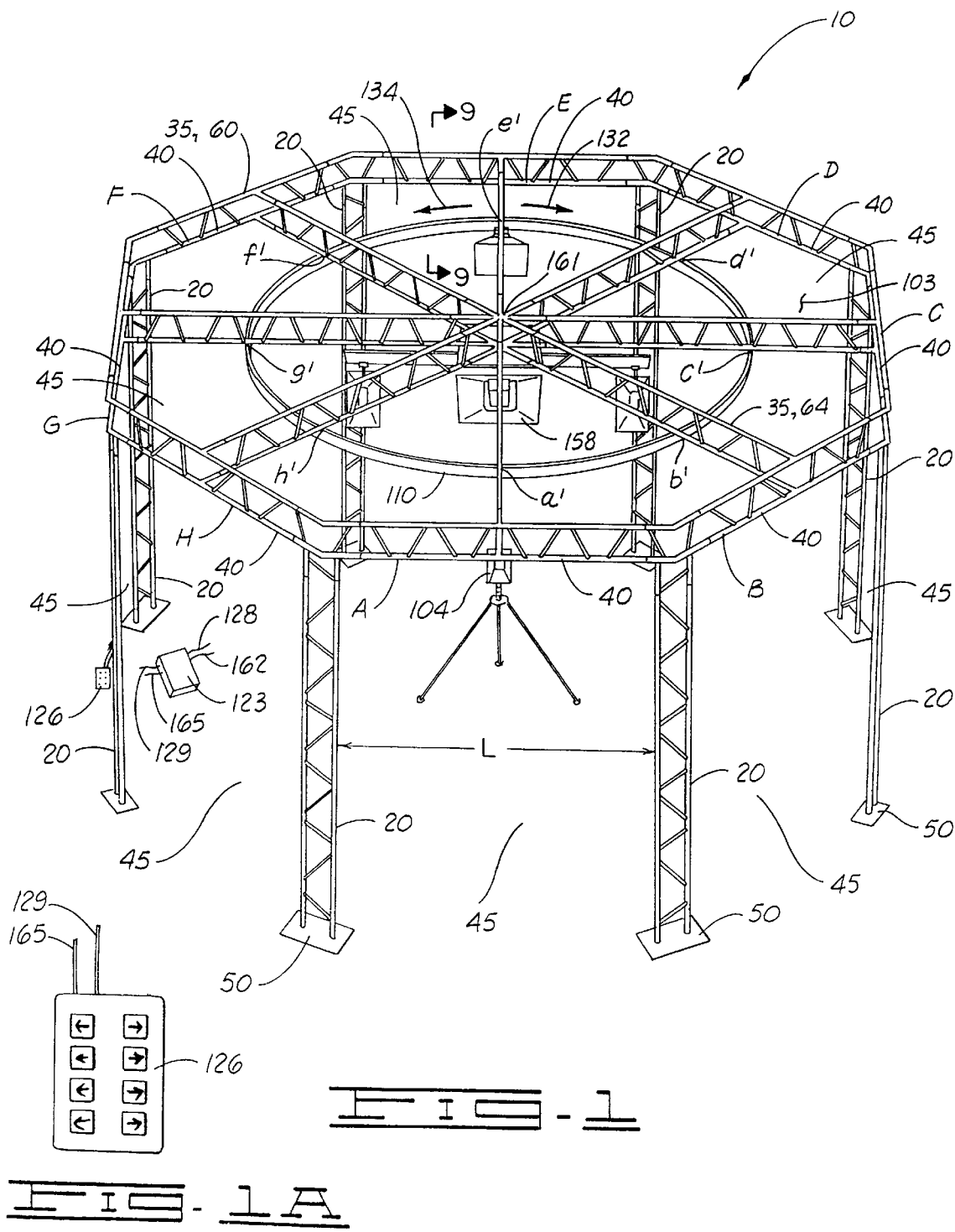
FIG. 1 shows a perspective view of the freestanding modular still photography studio of the present invention.
FIG. 1A schematically shows an enlarged view of a remote controller of the present invention.
Figure 2:
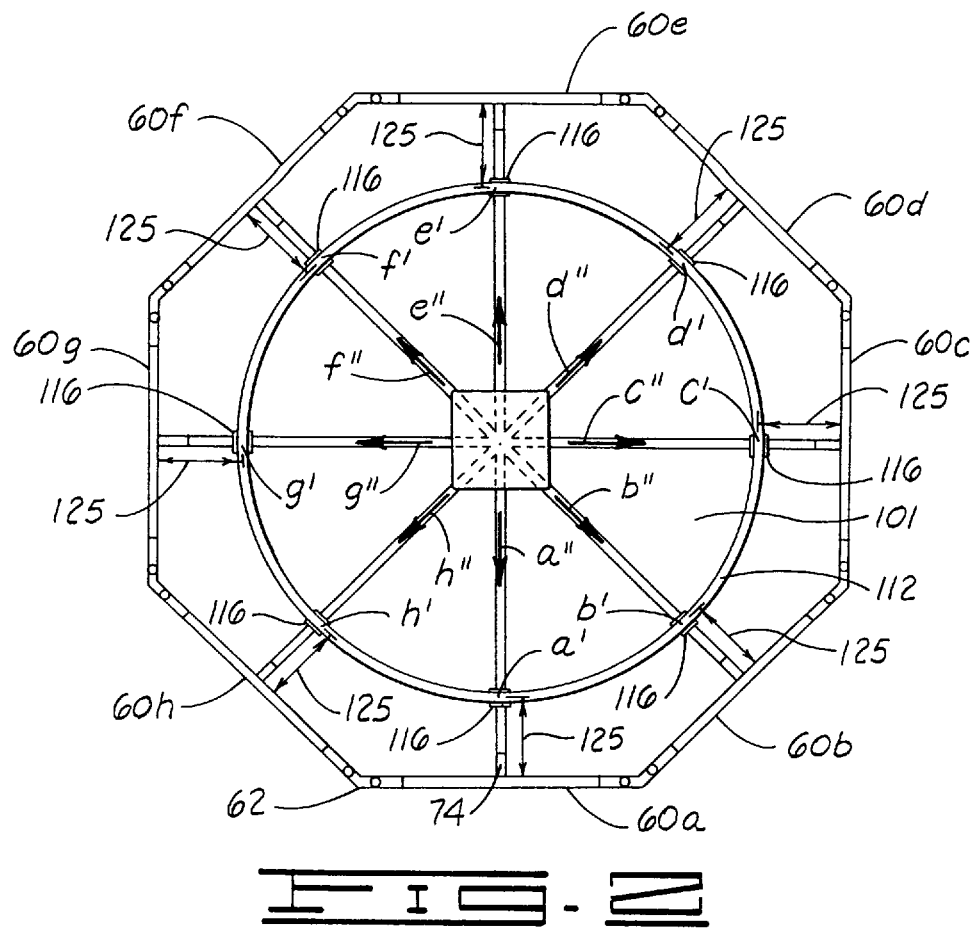
FIG. 2 shows a view looking up at the ceiling section of the present invention.

Referring now to the figures, and more particularly to FIG. 1, a freestanding modular still photography studio 10 is shown. Modular studio 10 may also be referred to herein as an apparatus for converting a confined, or limited space into a multiple set still photography studio. Studio 10 comprises a plurality of outer, or peripheral vertical legs 20 which may also be referred to as upright supports 20, each having an upper end 25 and a lower end 30. A ceiling section 35 is connected to the upper ends 30 of legs 20.

Legs 20 define a plurality of adjacent photography set frames, or photography set modules 40, wherein each photography set frame 40 is defined by a pair of adjacent legs 20 and provides, or defines a space 45 for creating, or locating an environmental still photography set 46, such as sets 46c and 46d schematically depicted in FIG. 8. A connecting beam 60 is attached to and extends between adjacent ones of vertical legs 25, so that a plurality of connecting beams 60 are included. Connecting beams 60 may comprise part of ceiling section 35 as will be described more fully herein.

The photography set frames in the preferred embodiment shown in FIG. 1 are depicted by the letters A, B, C, D, E, F, G and H. Each photography set frame 40 is comprised of a pair of adjacent legs 20 and a connecting beam 60. Space 45 is that space defined by adjacent legs 20 and a connecting beam 60 extending therebetween which may generally be a planar space. Connecting beams 60 may include the subscripts a–h for identification purposes, so that connecting beams 60 may be referred to as connecting beams 60a–60h corresponding to photography set frames A–H respectively. The term environmental still photography set, or set, as used herein, simply refers to a combination of props and other devices arranged to create a scene, or environment, in which any number of subjects can be photographed. The sets described with reference to the present invention are preferably three-dimensional sets, and thus include three-dimensional props and devices, but may also include or be comprised of one-dimensional flat backdrops.

Each leg 20 is mounted to, or connected to a base plate 50. As is better seen in FIG. 5, base plate 50 includes a pair of upwardly extending mounting stems 52. Legs 20 are preferably vertically oriented trusses having outer chords 56 and web members 58. Stems 52 extend upwardly into chords 56 to attach legs 20 to base 50. Legs 20 and mounting stems 52 may be connected with bolts extending therethrough or by other means known in the art.

Figure 4:
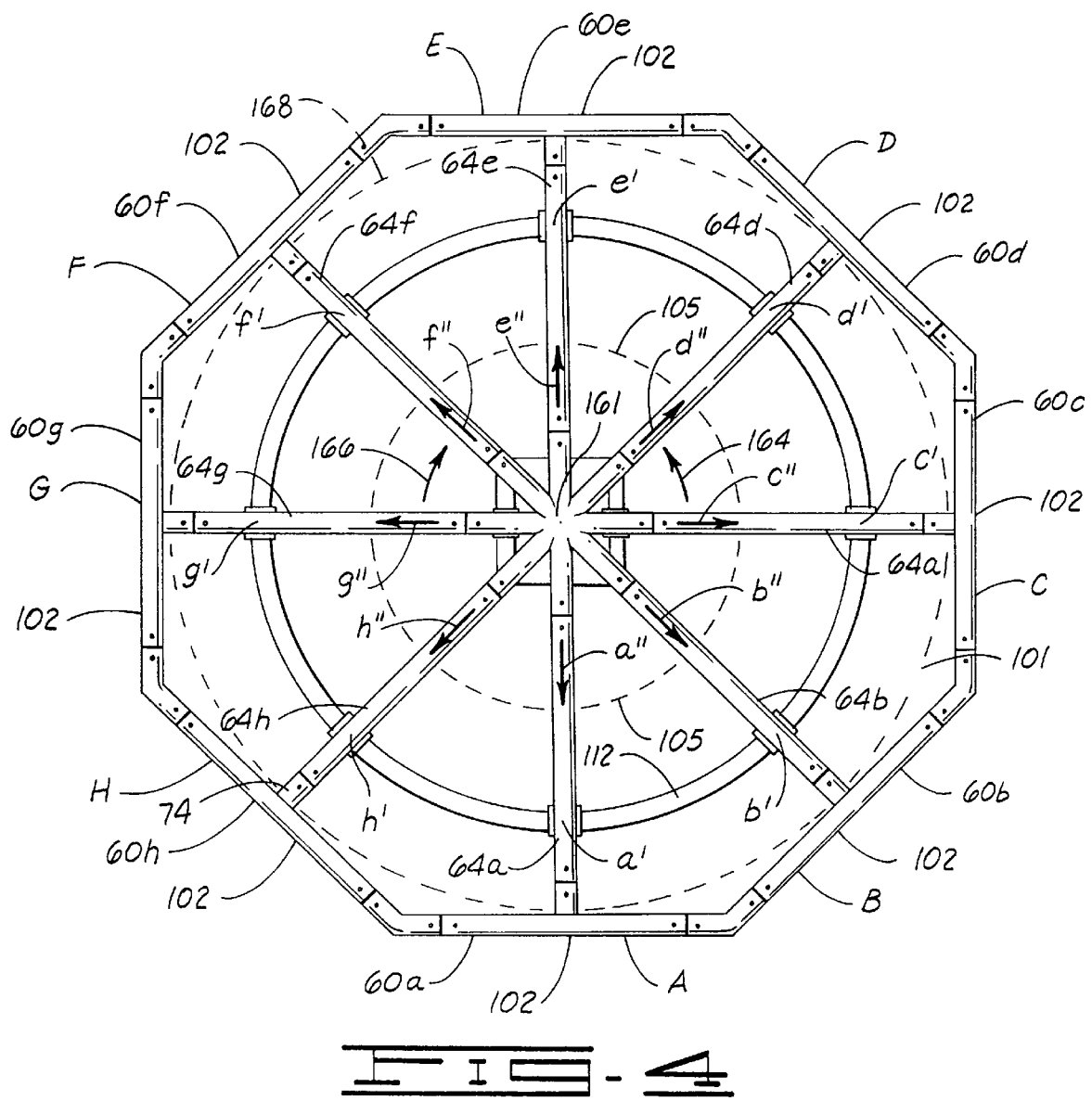
FIG. 4 is a top view of the embodiment of FIG. 1.

Ceiling section 35 comprises the plurality of outer or connecting beams 60, a plurality of connecting joints 62, a plurality of center or inner beams 64 and a central hub or spider 66. Connecting beams 60, in the embodiment shown, may comprise a truss having outer chords 70 and web members 72. Each connecting beam 60 further includes a connecting tee 74 extending therefrom. Connecting tee 74 includes chords 73 and a web member 75, and extends from a middle, or center 61 of connecting beam 60. As shown in FIGS. 4–6, connecting tees 74 preferably extend at right angles from chords 70. Connecting beams 60 further include outer ends 76.

Connecting joints 62 may comprise trusses with outer chords 78 and web members 80, and may include a downwardly extending connecting stem 82 attached thereto, comprising a truss with chords 81 and a web member 83. Connecting joints 62 are attached to upper ends 25 of upright supports 20 with connecting sleeves 84. Connecting sleeves 84 are received in the downwardly extending stems 82 of each connecting joint 62, and are received in upper end 25 of upright supports 20. A lower end 87 of downwardly extending connecting stem 82 may abut upper end 25 of upright support 20. Sleeves 84 may be connected utilizing bolts which extend through stems 82 and sleeves 84 and bolts which extend through legs 20 and sleeves 84.

Each of the outer beams 60 is connected at ends 76 to a connecting joint 62 in a similar manner. Connecting sleeves 84 are received within chords 78 of a connecting joint 62 and chords 70 of an outer beam 60. Bolts which extend through the sleeves 84 and the chords in both connecting joints 62 and outer beams 60 may be utilized to connect the connecting joints 62 and outer beams 60. Thus, outer beams 60 are connected to upright supports 20 by joints 62 and extend between adjacent upright supports 20. Each center beam 64 includes a first end 85, a second end 86 and comprises a truss having outer chords 90 and web members 92. Each center beam 64 is connected to an outer beam 60 with sleeves 84 which are received in chords 73 of connecting tee 74 and chords 90 at first end 85 of center beam 64. Bolts extending through chords 73 of connecting tee 74 and sleeves 84 and bolts extending through chords 90 of center beam 64 and sleeves 84 may be used to connect the outer beams 62 to center beams 64.

Central hub 66 in the embodiment shown includes eight legs 67, each of which comprise a truss having outer chords 98 and web members 100. Each of center beams 64 is connected at its second end 86 to a leg 67 of hub 66. Connecting sleeves 84 are received in chords 90 at second end 86 of center beams 64 and are likewise received in chords 98 of legs 67 of hub 66. Bolts extending through chords 90 of center beam 64 and chords 98 of legs 67 of central hub 66, and through sleeves 84 may be utilized to connect each center beam 64 to hub 66. Because each center beam is connected to connecting tee 74, which extends at a right angle from the center of a connecting beam 60, each center beam extends in a direction from hub 66 toward a center, or middle of a photography set frame, and divides the frame equally. Thus, center beams 64, like connecting beams 60, may carry the subscript a–h for reference purposes, and to identify the beams as 64a–64h corresponding to photography set frames A–H, respectively.

Modular studio 10 is preferably polyhedral shaped, and thus comprises a polyhedron having an interior 101. Although the term polyhedron is sometimes used to refer to a solid, the term as used herein simply refers to the polyhedral shape defined by adjacent photography set frames of the modular studio 10 such that all sides of the studio are polygons. Modular studio 10 is thus a multi-sided studio having sides 102 wherein each side 102 is defined by a plane extending between adjacent legs 20. Modular studio 10 further comprises a bottom 103 wherein the bottom is defined by a floor or ground surface on which the legs are placed and extend upwardly from, and a top side 105. Top side 105 may be defined by the plane extending between the uppermost chords 70 of connecting beams 60. As is clear from the top view shown in FIG. 4, a horizontal cross section of the polyhedron defined by the modular studio 10 is an equilateral polygon, and is preferably an octagon. Legs 20 of the studio comprise the corners of the polygonal shape of the horizontal cross section of the studio. Thus, in the embodiment shown, the sides of the polyhedron are rectangular and the top and bottom are octagonal.

By utilizing a shape such as a polyhedron, a camera means 104 can be located within the polyhedron, and further may be centrally located in the polyhedron within a defined area, such as a defined circle 105, so that with very little movement camera means 104 can be positioned to be directed at still photography sets corresponding to any of set frames A–H. Camera means generally includes any camera or other photographic equipment utilized in the art to take pictures or capture photographic images.

Any, or all of the photography set frames may have corresponding still photography sets. Thus, in the embodiment of FIG. 1, photography set frames A–G may have still photography sets 46 corresponding thereto, while set frame H is left empty to provide an entry and exit into the polyhedral shaped modular studio 10. In any event, while it may be that only selected of the photography set frames are utilized for still photography sets while others may be used as entries and exits, camera means 104 can capture photographic images of a still photography set corresponding to any of the photography set frames from within the polyhedron.

FIG. 8 schematically shows examples of still photography sets 46c and 46d operably associated with photography set frames C and D. Still photography set 46c comprises a column and a boulder, and may include any of various other props and devices. Still photography set 46d includes a tree and a plant and likewise may include various other props and devices. Because the still photography sets preferably utilize three-dimensional props and devices, each still photography set may be positioned so that at least a portion of the props and other devices used to create the still photography sets are in a still photography set frame and thus in the space 45 defined by the frame. A portion of the still photography set will extend inward and/or outward from the corresponding set frame itself. Inward, or forward refers to a direction toward the interior of the polyhedron, and thus toward the camera means. Outward, or rearward refers to a direction away from the interior of the polyhedron and thus the camera means.

It may also be that a still photography set is adjacent, either inwardly or outwardly, its corresponding photography set frame and not technically "in" the frame. The term operably associated herewith when used in reference to the relationship between a still photography set and a corresponding photography set frame means the set is located in and/or adjacent the corresponding still photography set frame.

Thus, a photographic image of a selected still photography set, such as the sets schematically depicted in FIG. 8, may be captured by directing the camera means, from inside the polyhedron, at the photography set frame corresponding to the selected still photography set and actuating the camera means. The outer boundary of the photographic image of the selected still photography set captured by the camera means may be within the corresponding frame. Thus, by utilizing the studio of the present invention, several still photography sets and subjects therein can be photographed from a central location with very little movement required of the camera means.

Furthermore, because legs 20 can divide any space into defined photography set frames, the legs acts as parameters for the set designer creating the still photography sets in the photography set frame. Legs 20 also separate still photography sets so that a consumer can view a plurality of sets at one time, and can select one or more still photography sets in which to have a photographic portrait taken. The photography set frames thus function to house and separate corresponding still photography sets.

Studio 10 may further include a rail system 110 positioned a predetermined distance inward from the center, or middle of each photography set frame. Rail system 110 may include a rail 112 attached to center beams 64 of ceiling section 35 with a plurality of scaffolding brackets 116. Rail system 110 further includes a motorized carriage 118 which comprises a carriage 120 and a motor 122. A light 124 is attached to carriage 120 in a manner known in the art. Each of the pieces described with regard to the rail system are well known in the art and may be provided by Bogen, and are offered as part of the Bogen Pro Studio Rail System.

Carriage 120 includes wheels 121 that are carried by rail 112, so that the carriage and light 124 are movable along rail 112. In the embodiment shown, rail 114 is comprised of a plurality of arcuately shaped rail sections, and is preferably an endless rail. Thus, the rail may be circular as shown in FIG. 4. Light 124 is therefore movable along rail 112 to a position inward of any of photography set frames A–H to provide lighting to a still photography set corresponding to any of photography set frames A–H.

Motor 122 may be connected to a power pack 123 by a cable 128, which is connected to a remote controller 126 with a cable 129. Power pack 123 may have a plurality of inlet ports to connect to a plurality of motors, and a plurality of outlet ports to connect to remote controller 126, so that remote controller 126 can control a plurality of motors. FIG. 1 schematically shows four inlet and outlet cables, which could control four motors. More or fewer motors and cables can be included. The remote controller and power pack are drawn far out of scale in FIG. 1 solely for the sake of clarity. The motor, power pack and remote controller are all commercially available from Bogen as part of the Bogen Pro Studio Rail System.

In the embodiment shown, the top two buttons on remote controller 126 can be utilized to move light 124 in either of two directions 130 or 132 along rail 112 to any desired position along the rail so that lighting may be provided for a selected still photography set corresponding to any of the still photography set frames A–H. For instance, light 124, which can be any type of light such as, but not limited to Paul C. Buff, Ultra 600, or Norman LH 500, may be moved to predetermined light positions a', b', c', d', e', f', g' and h' corresponding to modules A, B, C, D, E, F and G, respectively or can be located anywhere along the rail as desired.

In the embodiment of FIG. 1, rail 112 and center beams 64 are located so that when light 124 is directly beneath a center beam, it provides proper lighting to a selected module. Thus, in the embodiment shown, light positions a'–h' are beneath center beam 64a–64h respectively. The distance between position a' and connecting beam 64a is the same as the distance between position b' and connecting beam 64b and so on through light position h' and connecting beams 64b, so that the distances 125 between light positions a'–h' and set frames A–H respectively are equidistant. The only manipulation required of light 124 attached to rail 112 is movement on the rail to the selected position. Lights can also be attached at predetermined locations as desired. In other words, stationary lights can be used at each of locations a'–h', rather than having one movable light 124 carried on rail 112.

Studio 10 may further include a rotating main light assembly 140, or center light assembly which may be referred to as a copter kit available from Bogen as part of the Bogen Pro Studio Rail System. Light assembly 140 is mounted to ceiling section 35 with scaffolding brackets 116. The scaffolding brackets may be bolted to longitudinal rails 142 which have a cross-sectioned shape identical to rail 112. The assembly includes an upper plate 144 and a lower plate 146 having a bearing 148 disposed therebetween. A plurality of carriages 150 having wheels 151 are connected to upper plate 144. The wheels of carriages 150 are carried in tracks 142 which are connected to scaffolding brackets 116, thus attaching the rotating assembly to ceiling section 35. Bearing 148 allows lower plate 146 to rotate relative to upper plate 144, so that main light assembly 140 is rotatably suspended from ceiling section 35.

Figure 11:
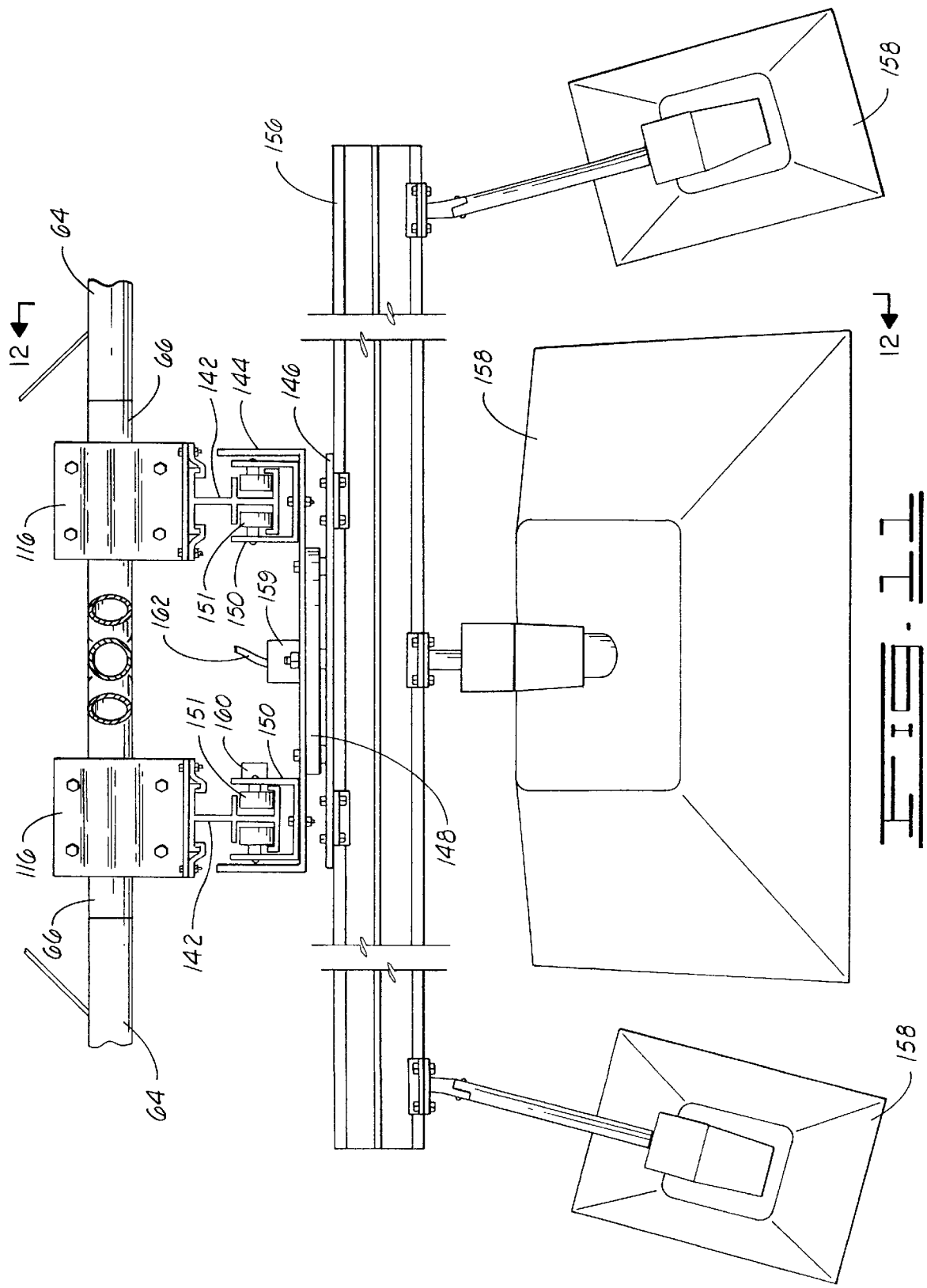
FIG. 11 shows the main light assembly mounted to the studio of the present invention.
Figure 12:
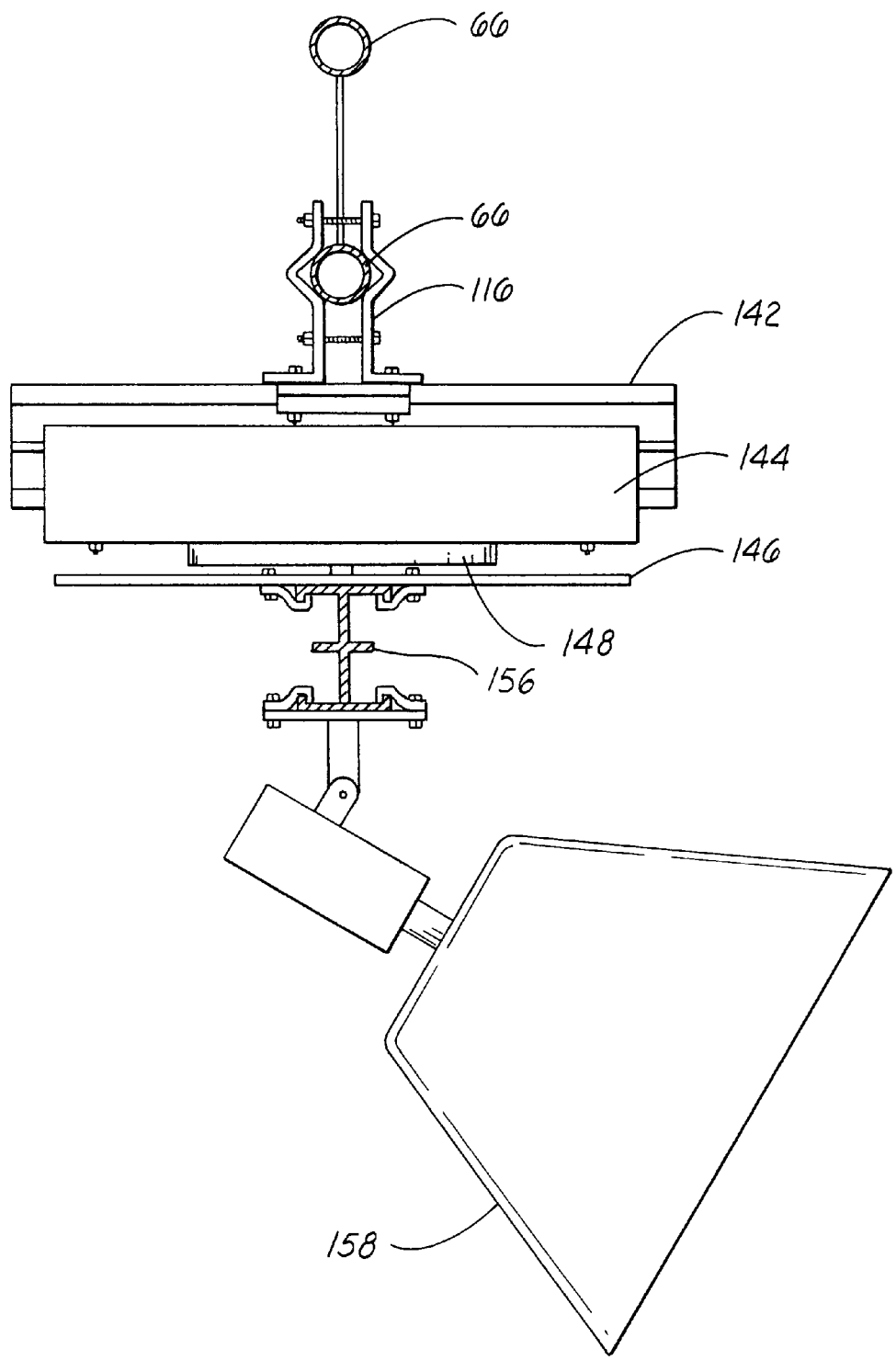
FIG. 12 shows a view from line 12—12 of FIG. 11.

A longitudinal connecting rail 156, which is identical in cross section to rails 112 and 142, is connected to lower base plate 146 with brackets and bolts in a manner known in the art. A plurality of lights 158 may be connected to and extend downward from rail 156. Lights 158 may include any light used in the photography industry including Paul C. Buff, Ultra 1200 and/or Norman GL 3000. Thus, lights 158 may comprise a single light, a plurality of a single type of light, and since more than one type of light can be used, lights 158 may comprise a combination of various types of lights. The main or central light assembly may be motorized so that motors 159 and 160 may be included. Motors 159 and 160 are shown schematically in FIG. 11 and are known in the art. Motor 159 will cause lower plate 148, rail 156 and lights 158 to rotate whereas motor 160 can, if desired, cause longitudinal movement of the lights.

For example, in the embodiment shown, rails 142 extend only slightly beyond the edges of upper plate 144. Further, in the embodiment shown carriages 150 will be fixedly attached to rail 142 with bolts or other fasteners known in the art to prevent longitudinal movement. However, if desired, longer pieces of rail can be substituted for rails 142 and the carriages will provide for longitudinal movement of the entire assembly along those rails. Motor 160 may be included to provide such movement.

Main light assembly 140, and lights 158 attached thereto are centrally positioned, and as shown may be at the center 161 of the modular studio 10. Modular studio 10 thus provides a rotatable main light assembly, wherein the lights included therewith or attached thereto can be rotated to direct light at a still photography set corresponding to any of photography set frames A–H. Main light assembly 140 and the lights attached thereto or included therewith are thus repositionable and selectively directable at a still photography set corresponding to any of the modules A–H.

Centrally positioned main light assembly 140 is substantially equidistant from each photography set frame 40, and is located at a predetermined distance from the photography set frames so that the only manipulation required to direct the center, or main light assembly is to rotate the assembly. The direction of the center light assembly may also be preset, or predetermined for each photography set frame. As explained previously, center beams 64 extend from center hub 66 directionally toward center 61 of a connecting beam 60, which equally divides the space 45 between adjacent legs 20. Main light assembly 140 may thus be rotated so that it directs light at the center of a photography set frame, simply by aligning the direction of the lights 158 with the direction of a central beam 64. Modular studio 10 thus may include a plurality of predetermined central, or main light locations, or directions a"–h" corresponding to photography set frames A–H, respectively.

Preferably, the main light assembly 140 is remotely rotatable. Thus, a remote cable 162 connects motor 159 to power pack 123, and a cable 165 connects power pack 123 to remote controller 126. Remote controller 126 may then be used to move light 124 attached to rail 112 and to rotate lights 158 attached to main light assembly 140. Remote controller 126 can operate to rotate the lights 158 in either of directions 164 or 166 as indicated in FIG. 4. Thus FIGS. 1 and 1A show an arrangement whereby the remote controller 126 is connected to and controls motors 122 and 159. However, the power pack and remote controller may have sufficient inlet and outlet ports to allow up to eight motors to be operated from the single remote controller 126. Thus, the arrangement may be modified to include as many motors as the power pack and remote controller will allow. As set forth above, the motors, power pack, and remote controller are commercially available from Bogen.

Although, as described herein, the remote operation may simply comprise pushing a button on remote controller 126 and holding the button until a desired position, or direction, is reached for both the lights attached to rotatable light assembly 140 and the light 124 attached to rail 112, other variations known in the art may be used. A remote controller may be provided to operate so that at the push of a selected button, light 124 moves along rail 112 to any preselected or predetermined point, for instance, any of positions a'–h', and stops automatically. Such operation can be achieved with mechanical switches, timing devices or other means well known in the art. Likewise, the rotating light assembly may be modified so that a position or direction such as a"–h", may be remotely selected wherein at the push of a selected button the rotating light assembly rotates to direct light in the selected direction and stops automatically at the selected position. Any of the foregoing can be implemented by appropriate analog or digital control and can include discrete or integrated circuitry, or computer hardware or software.

The modular studio 10 is an improvement over anything known in the still photography art and provides many features and advantages not possible otherwise. One primary advantage is that modular studio 10 provides a plurality of adjacent photography set frames, or modules each of which may have a corresponding still photography set, and can convert any space, limited or otherwise, into a multiple set photography studio. For example, modular studio 10 may have a linear distance L, of eight feet between adjacent legs. A polyhedron having set frames of approximately eight-foot width may be circumscribed by a circle with a diameter of approximately twenty-one to twenty-two feet, depending on the width of the trusses used for the legs. Because the still photography sets may be adjacent the photography set frames, both inwardly and outwardly, the modular still photography studio should be designed with a distance L which will provide some distance between legs 20 and a wall of the space being converted into the multi-set photography studio. Thus, a modular still photography studio wherein L is eight feet could be assembled and/or placed in a room having a length and width of twenty-five feet and would provide ample room to create three-dimensional environmental still photography sets corresponding to each photography set frame module. Such a studio can thus provide eight photography set frames, and eight corresponding still photography sets, or seven still photography sets with an entry and an exit frame all within a room having a length and width of approximately twenty-five feet or less. The modular studio of the present invention can be placed in a room with smaller dimensions wherein, for example, opposed photography set modules A and E and opposed modules C and G are positioned close to a wall of the limited space. Ample room would still be provided to create three-dimensional environmental photography sets in the remainder of the modules and in fact could be created in photography set modules in A, C, E and G, by utilizing space slightly forward of modules A, C, E and G. Additionally, the distance between adjacent legs can be shortened, for example to six feet so that the modular studio can be located in an even smaller space. Thus, the present invention provides an apparatus which will convert a confined or limited space, walled or otherwise, into a multiple set photography studio in which a plurality of still photography sets can be located and utilized in a time and space efficient manner.

Because the position of the lights and the position of the still photography set are predetermined, the proper location of the subject to be photographed may also be predetermined and that position may generally be designated by the dotted line 168 shown in FIG. 4. Additionally, all of the lights including secondary or accents lights, and main lights, may be attached at predetermined locations on the studio. The main light assembly is rotatable and can be directed at any of the photograph set frames. Further, because the camera means can be located in the polyhedron and can be directed at a still photography set corresponding to any photography set frame, the modular studio 10 gives the appearance of a studio in the round. The primary equipment necessary to take professional photographs and portraits can thus be confined within the modular studio itself and can be manipulated from within the modular studio.

In addition, the studio of the present invention is easily assemblable and disassemblable and thus can convert any defined space such as a single room in an existing studio, into a multiple set studio and provide space to create a plurality of still photography sets. The sets can be changed periodically as described herein and can include any number of sets and types of settings such as a library setting, sports theme settings, Italian architecture with columns and outdoor scenes. The still photography sets provided can be three-dimensional so that as described above, the props used to create each set may extend forward and backward of adjacent legs. Photographs taken in such a setting avoid the fake look that comes from flat, one-dimensional backdrops and can emulate indoor and outdoor environments to be used in still photography. Thus, a plurality of lifelike, three-dimensional still photography sets can be created and located in the controlled environment of a professional photography studio with relative ease.

Figure 3:
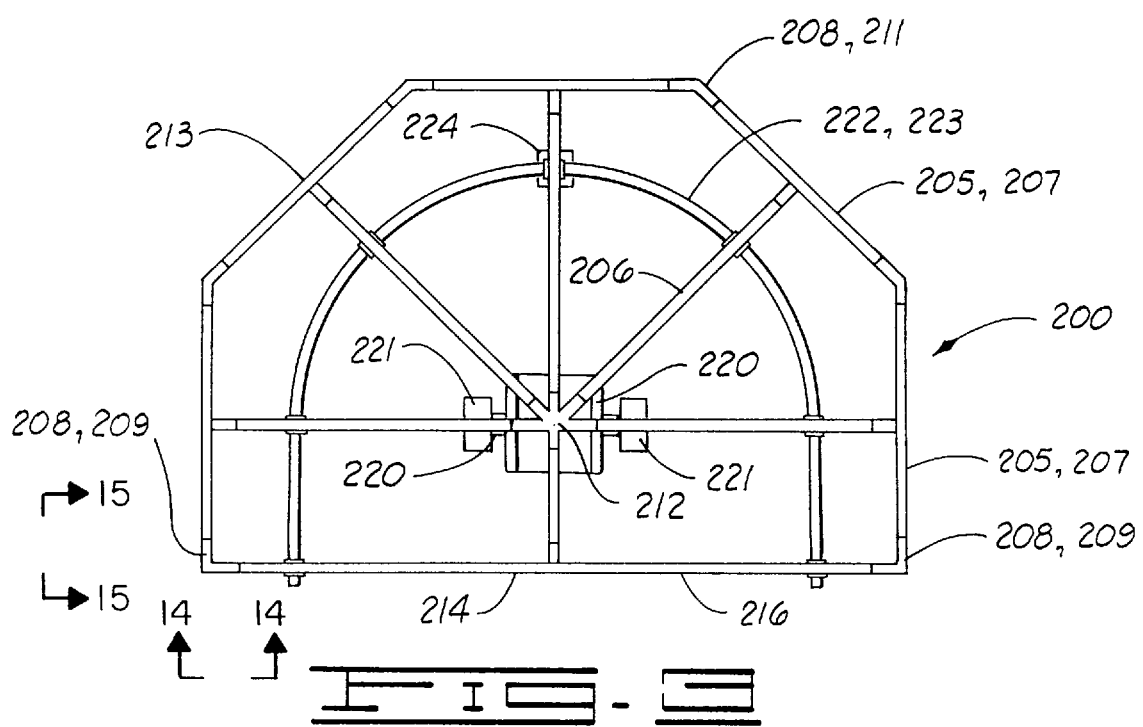
FIG. 3 shows a top view of an additional embodiment of the studio of the present invention.

Although the embodiment of FIG. 1 depicts a polyhedron with a horizontal cross section shaped like an equilateral polygon, modular studios of other shapes which require less space, and studios shaped to fit in oddly dimensioned spaces are within the scope of this invention. FIG. 3 shows an additional embodiment of the studio of the present invention. Shown therein is a modular still photography studio 200 which includes vertical legs 201 connected to base plates 204. Ceiling section 205 connected to an upper end of the vertical legs includes center beams 206, connecting beams 207, connecting joints 208, and a central hub 212. The pieces are connected to one another in the manner described previously with respect to the modular studio 10. The primary difference is simply that the embodiment shown in FIG. 5 is a polyhedron with five equal length sides 213 and a long side 214 and thus will fit in a smaller space, or a differently shaped space than the embodiment shown in FIG. 1.

The embodiment of FIG. 3 includes an extended outer beam 216 which is connected at each end with sleeves 84 in the manner described herein. Thus, as shown in FIGS. 14 and 15, legs 201 may include corner legs 202 and connecting beam joints 208 may include corner connectors 209 to which extended outer beam 216 is connected. Corner legs 202 may be L-shaped and include two outer chords 203 and inner chord 205 with web members extending therebetween. Base plates 204 may thus include base plates 228 which are L-shaped and which include a middle or center stem 232 and outer stems 230 which will be received in the chords of corner legs 202.

Corner connectors 209 likewise may be L-shaped so that sleeves 84 may be received therein to connect legs 201, beam 216 and beams 207. The remainder of the legs 201 and connecting joint 208, besides corner connectors 209 and corner legs 202, may be referred to as joints 211 and legs 215 and are like those described with reference to the embodiment of FIG. 1. Legs 215 are thus located beneath and are connected to joints 211. Studio 200 likewise includes a centrally positioned light assembly 220 that is equidistant from a plurality of modules A–E, so that light can be directed at each photography set module simply by rotating the assembly as described with reference to the embodiment shown in FIG. 1. Light assembly 220 may have lights 221 attached thereto. Studio 200 includes a rail system 222, comprising a rail 223 with a light 224 attached thereto in the manner previously described with reference to studio 10. The rail is positioned so that the light attached thereto can be moved to predetermined locations and positions forward of each photography set module to provide lighting thereto, as described with reference to the embodiment of FIG. 1. The rail 223 is continuous, but as is clear from the drawings is not an endless rail.

Figure 13:
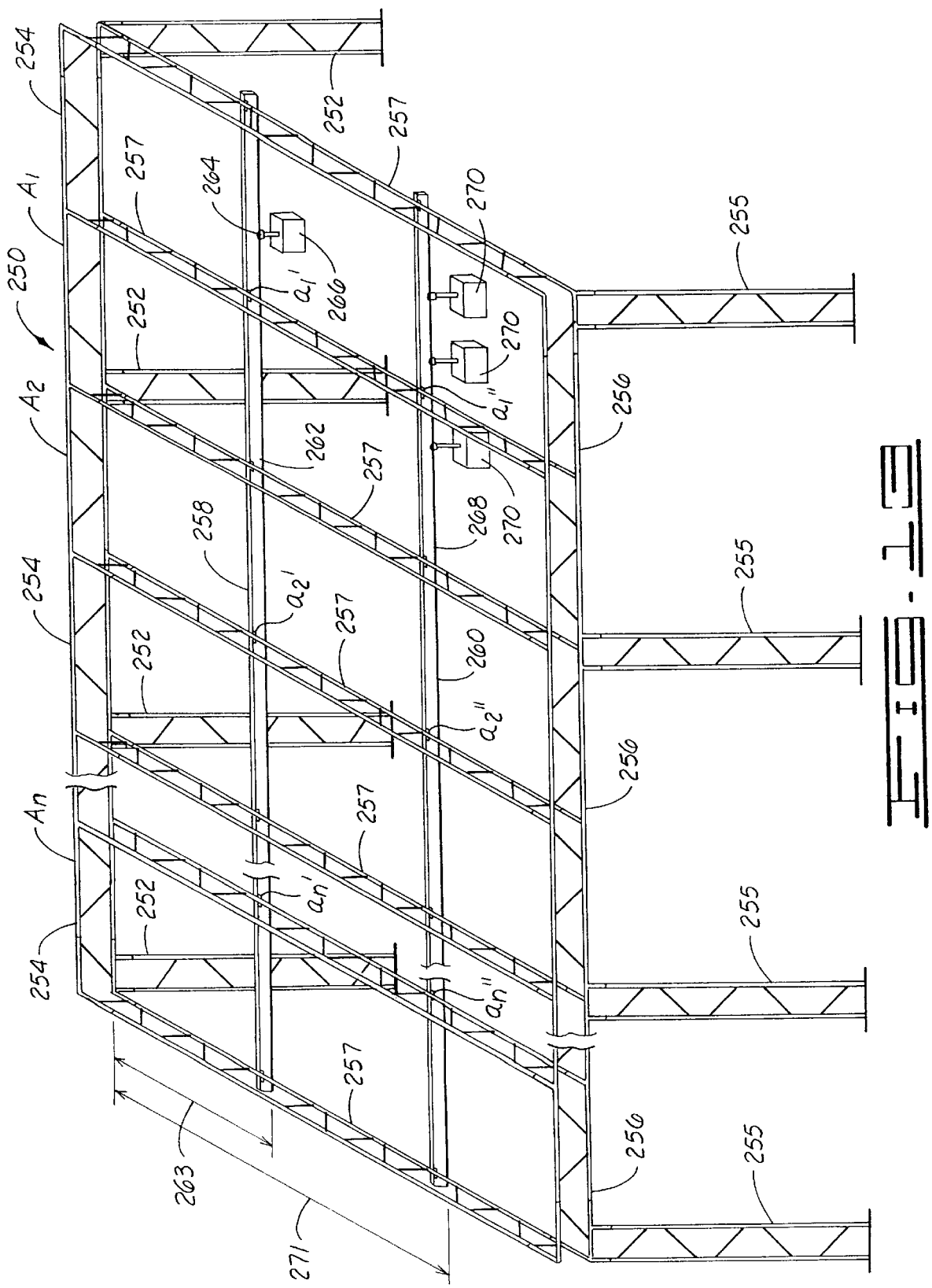
FIG. 13 shows an additional embodiment of the studio of the present invention.

A polyhedral modular studio may have any horizontal cross-sectional shape—square, hexagon or any other desired shape. Thus, a studio with a horizontal cross section of any closed shape, even a circle, is within the scope of the invention. A studio with a circular cross section would define a cylindrical shape. Further, adjacent modules may be beside one another in a straight line, so that the modular studio is linear as schematically shown in FIG. 13.

Linear studio 250 may include a plurality of adjacent modules $A_1-A_n$ where n is any number. The modules are defined by adjacent rear vertical legs or upright supports 252. Rear outer beams 254 may extend between and be connected to adjacent rear vertical legs 252. Linear studio 250 may also comprise a plurality of forward vertical stabilizing legs 255 with forward outer beams 256 extending therebetween and connected thereto. A plurality of lateral stiffening beams 257 extend between and are connected to outer beams 254 and 256, and comprise ceiling section 257. Outer vertical support legs and lateral stiffeners can be added to provide support as required.

Linear studio 250 further includes rail systems 258 and 260. Rail system 258 includes a rail 262 having a cross section identical to rail 112 shown in the prior embodiment, and further includes a motorized carriage 264 with a light 266 extending downward therefrom. Rail 262 is positioned a predetermined distance 263 forward of the modules so that the light carried thereon may be moved to any predetermined position, such as positions $a'_1-a'_n$ on the rail to provide lighting to each module $A_1-A_n$. As is obvious from the drawing, the distance 263 is constant. Thus, light 266 carried on rail 260 is positioned an equal distance forward of each module. Rail system 260, which may be a main light rail system 260, may include a rail 268 having a system of lights 270 movably mounted thereon. Lights 270 can be any desired type of light, and can be attached with movable carriages 272 as previously described. All of the lights 270 can be attached and mounted to move as one unit to any of positions a"$_1$–a"$_n$. The components described herein are available from Bogen and are known in the art. Lights 270 are located a predetermined distance 271 forward of the module. Because rail 268 is a straight continuous rail, the rail is equidistant from each module, and the light can be moved along the rail and to any position to provide lighting to any module. A linear studio 250 can be utilized to provide a plurality of photography set frames and corresponding still photography sets where a long, somewhat narrow space is available.

As can be readily seen from the foregoing description, studio 10 provides numerous advantages over anything known in the prior art. Thus, the present invention is well adapted to carry out the objects and advantages mentioned as well as those that are inherent therein. While numerous changes may be made by those skilled in the art, such changes are encompassed within the spirit of the invention as encompassed by the appended claims.

What is claimed is:

1. A freestanding modular still photography studio comprising:
    a plurality of adjacent photography set frames, each of said photography set frames comprising a pair of adjacent, substantially vertical legs having a connecting beam attached thereto and extending therebetween, said studio thereby comprising a plurality of substantially vertical legs and a plurality of connecting beams, said photography set frames being arranged to define a polyhedron, each photography set frame defining a space for positioning one or more props to create a still photography set;
    a still photography set operably associated with at least one of said photography set frames; and
    a plurality of center beams extending radially outwardly from a central hub, said center beams being connected at one end to said central hub and at a second end to a connecting beam, said central hub and center beams comprising a ceiling section, wherein said center beams may have a light attached thereto to provide lighting for said photography set frames.

2. The studio of claim 1, further comprising:
    a main light assembly suspended from said ceiling section, wherein said main light assembly is selectively directable at any of said photography set frames to provide lighting to a still photography set operably associated therewith.

3. The studio of claim 2 wherein said main light assembly is centrally positioned in said polyhedron, and is rotatably suspended from said ceiling section, said main light assembly thereby being rotatable to be directed at any of said plurality of said photography set frames to provide lighting to a still photography set operably associated therewith.

4. The studio of claim 3, wherein said main light assembly is remotely rotatable to provide lighting to a still photography set corresponding to any of said photography set frames.

5. The studio of claim 1 further comprising:
    a continuous rail mounted to said ceiling section; and
    an accent light movably attached to said rail, said accent light being movable along said rail to provide lighting to each of said plurality of photography set frames and still photography sets operably associated therewith.

6. The studio of claim 5, wherein said accent light is remotely movable along said rail.

7. The studio of claim 1 wherein a horizontal cross section of said studio comprises an equilateral polygon.

8. The studio of claim 1 wherein each of said substantially vertical legs comprise a truss.

9. The studio of claim 1 further comprising camera means, said camera means being located within said polyhedron wherein said camera means can be directed at a still photography set corresponding to any of said photography set frames from within said polyhedron.

10. Apparatus for converting a walled space into a still photography studio having a plurality of adjacent photography set modules, said apparatus comprising:
    a plurality of upright supports, wherein each photography set module of said plurality of modules comprises adjacent upright supports and a connecting beam extending therebetween, said modules providing spaces for positioning props to create still photography sets, selected of said photography set modules having a still photography set operably associated therewith;
    a ceiling structure comprising a plurality of center beams connected to said connecting beams and extending radially inwardly therefrom;
    a continuous light rail attached to said ceiling structure; and
    at least one light mounted to said continuous rail to provide lighting to still photography sets operably associated with said photography set modules, wherein said apparatus is located within said walled space.

11. The apparatus of claim 10 wherein said at least one light is movable along said continuous rail to provide lighting to a still photography set corresponding to any of said photography set modules.

12. The apparatus of claim 11 wherein said light is movable between a plurality of predetermined light positions, each of said light positions corresponding to a photography set module, and wherein said light stops automatically at a remotely selected of said predetermined light positions.

13. The apparatus of claim 10, said apparatus comprising a polyhedron wherein a plane defined by adjacent ones of said upright supports define a side of said polyhedron, and wherein said continuous rail is arcuately shaped.

14. The apparatus of claim 13 wherein said rail is an endless rail.

15. The apparatus of claim 13 wherein a horizontal cross section of said polyhedron is an equilateral polygon.

16. The apparatus of claim 10 further comprising a main light assembly rotatably suspended from said ceiling structure, said main light assembly being rotatable to provide light to a still photography set corresponding to any of said photography set modules.

17. The apparatus of claim 16 wherein said light attached to said rail is remotely movable along said rail, and wherein said main light assembly is remotely rotatable.

18. The apparatus of claim 11 wherein said light is remotely movable.

19. A freestanding modular still photography studio comprising:
    a plurality of substantially vertical legs, said legs being arranged so that planes extending between adjacent legs define the sides of a polyhedron, said legs defining a plurality of adjacent photography set frames, each said photography set frame comprising adjacent ones of said legs;
    each said photography set frame providing a space for positioning props to create a still photography set, wherein a plurality of said photography set frames may simultaneously have still photography sets operably associated therewith;
    a plurality of center beams connected to and extending radially inwardly from said connecting beams, said center beams and said connecting beams comprising a ceiling section; and camera means located in said polyhedron, said camera means being directable at a still photography set corresponding to any of said photography set frames, wherein a photographic image of a selected still photography set may be captured from within said polyhedron by directing said camera means at the photography set frame corresponding to said selected photography set and actuating said camera means.

20. The studio of claim 19 having a horizontal cross section such that said legs define the corners of an equilateral polygon.

21. The studio of claim 20 wherein said equilateral polygon comprises an octagon.

22. The studio of claim 19 further comprising:

a light rail connected to said center beams; and a light attached to said light rail, said light being movable along said light rail.

23. The studio of claim 22, wherein said light rail is circular.

24. The studio of claim 22, wherein said light mounted to said rail is remotely movable to a plurality of predetermined positions, and wherein said light stops automatically at a selected of said predetermined positions on said rail.

25. The studio of claim 23 further comprising a main light assembly rotatably suspended from said ceiling section, said main light assembly being rotatable to provide lighting to a still photography set corresponding to any of said photography set frames.

26. The studio of claim 25 further comprising:

an endless light rail connected to said ceiling section;

a light attached to said light rail, said light being movable along said endless light rail.

27. The studio of claim 19, wherein said legs comprise vertically oriented trusses, said trusses including a pair of vertical chords having a plurality of web members extending therebetween.

28. The apparatus of claim 19, further comprising connecting beams attached to and extending between adjacent ones of said legs, wherein each of said photography set frames comprise adjacent ones of said legs and a connecting beam extending therebetween.

29. The apparatus of claim 19 further comprising lights connected to said center beams to provide lighting to still photography sets operably associated with said still photography set frames.

30. The apparatus of claim 19 further comprising a central hub located inwardly from said connecting beams, wherein said center beams are connected at a first end to said connecting beams and at a second end to said central hub.

31. A freestanding modular still photography studio comprising:

a plurality of adjacent photography set modules, said photography set modules being defined by a plurality of vertical legs, wherein each photography set module of said plurality of modules is comprised of adjacent ones of said legs and a connecting beam extending therebetween, each of said modules providing a space for positioning a still photography set, said studio comprising a linear studio wherein said adjacent photography modules are oriented to form a substantially straight line;

a ceiling section connected to said vertical legs;

a continuous longitudinal rail attached to said ceiling section, said rail being located a predetermined distance forward of said modules, said longitudinal rail extending longitudinally from a first module at a first end of said linear studio to a last module at a second end of said linear studio; and a light movably attached to said rail, said light being movable on said rail to provide lighting to all of said adjacent photography set modules.

\* \* \* \* \*

UNITED STATES PATENT AND TRADEMARK OFFICE
CERTIFICATE OF CORRECTION

PATENT NO. : 5,915,132
DATED : June 22, 1999
INVENTOR(S) : Jack Edwin Counts, Jr.

It is certified that error appears in the above-indentified patent and that said Letters Patent is hereby corrected as shown below:

On the title page, item [56], insert the following

| Document No. | Date | Name | Class | Subclass |
|---|---|---|---|---|
| 501,340 | 7/1893 | Hackh | 396 | 1 |
| 1,428,139 | 9/1922 | Brown | 396 | 1 |
| 3,952,322 | 4/1976 | Wolfe | 396 | 1 |
| 5,383,099 | 1/1995 | Peters | 396 | 1 |

In the Claims

Claim 25 should be dependent from claim 19 rather than claim 23.

Signed and Sealed this

Twenty-third Day of November, 1999

Attest:

Q. TODD DICKINSON

*Attesting Officer*    *Acting Commissioner of Patents and Trademarks*